(12) United States Patent
Gretz

(10) Patent No.: US 6,386,489 B1
(45) Date of Patent: May 14, 2002

(54) CABLE SUPPORT

(75) Inventor: Thomas J. Gretz, Clarks Summit, PA (US)

(73) Assignee: Arlington Industries, Inc, Scranton, PA (US)

( * ) Notice: Subject to any disclaimer, the term of this patent is extended or adjusted under 35 U.S.C. 154(b) by 0 days.

(21) Appl. No.: 09/867,145

(22) Filed: May 29, 2001

Related U.S. Application Data

(63) Continuation-in-part of application No. 09/782,912, filed on Feb. 14, 2001.

(51) Int. Cl.[7] .............................. B65D 63/02; F16L 3/08; F16L 3/00; F16L 3/12; F16L 3/22
(52) U.S. Cl. ..................... 248/74.3; 24/20 R; 174/72 A
(58) Field of Search ............................. 248/53, 58, 60, 248/62, 68.1, 69, 71, 74.3; 174/72 A; 24/20 R, 24, 20 EE, 25

(56) References Cited

U.S. PATENT DOCUMENTS

| 5,293,669 | A | * | 3/1994 | Sampson | ........................ 24/16 |
| 5,457,853 | A | * | 10/1995 | Klein | .............................. 24/16 |
| 5,511,288 | A | * | 4/1996 | McAndrews | ................... 24/16 |
| 5,746,401 | A | * | 5/1998 | Condon | ........................ 248/62 |
| 5,816,543 | A | * | 10/1998 | Kraus | ........................... 248/73 |
| 6,222,128 | B1 | * | 4/2001 | Gretz | ........................ 174/72 A |
| 6,313,406 | B1 | * | 11/2001 | Gretz | ........................ 174/72 A |
| 6,343,407 | B1 | * | 2/2002 | Muto et al. | ..................... 24/20 |

* cited by examiner

Primary Examiner—Kimberly T. Wood
Assistant Examiner—Amy J. Sterling

(57) ABSTRACT

An integral or unitary flexible cable support comprising: 1) a base for mounting on an appropriate structural member and including at least one recess, and 2) a flexible strap integrally formed with the base, the flexible strap having a base end attached to the base, a distal end that includes a key hole shaped aperture for engaging an appropriate attachment button on the front of the base and at least one tab on the front surface of the strap. In use, cable or wiring to be supported is placed within the flexible strap, the strap bent to encompass the wiring, the keyhole shaped aperture engaged about the attachment button and the at least one tab engaged with the recess on the base.

10 Claims, 6 Drawing Sheets

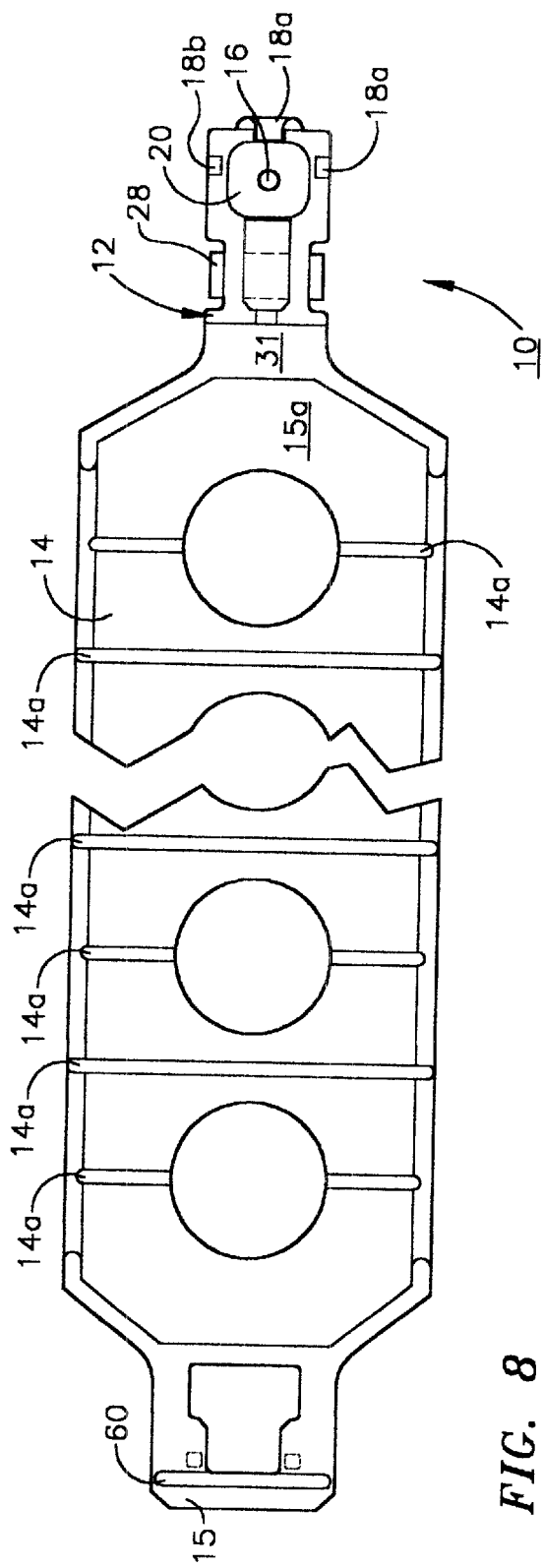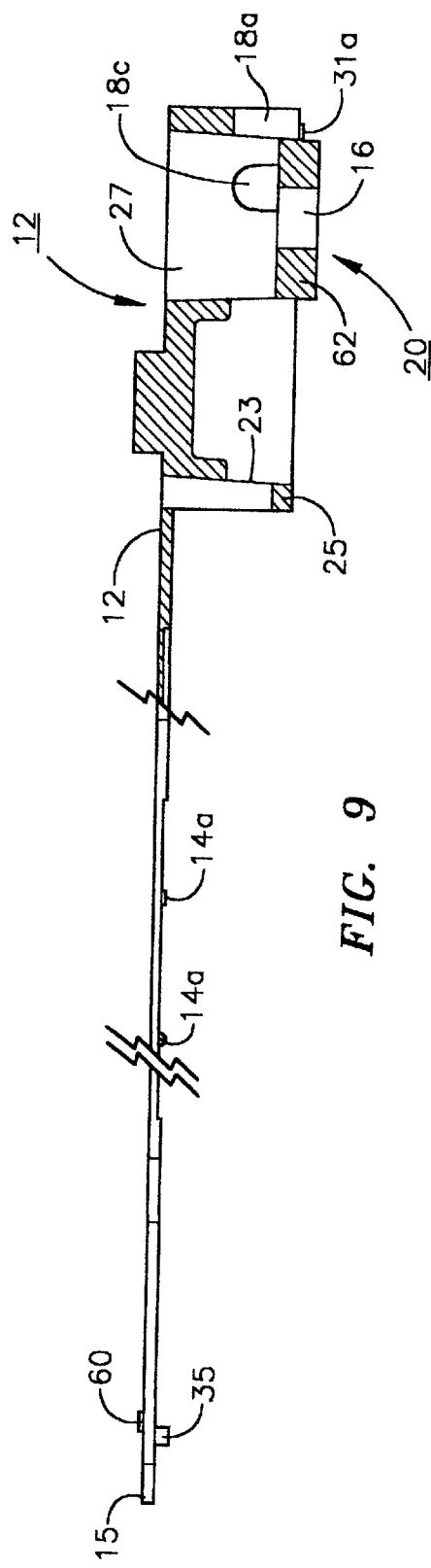

CABLE SUPPORT

This application is a continuation-in-part of U.S. patent application Ser. No. 09/782,912 filed Feb. 14, 2001 entitled "Cable Support" in the name of Thomas Gretz and copending herewith.

FIELD OF THE INVENTION

The present invention relates to supports for communications cable and the like and more particularly to a flexible such supports that provide a safe and secure mounting for fiber optic and other similar cables in areas where relatively flat mounting locations are not readily available.

BACKGROUND OF THE INVENTION

With the advent and growth of computer and communications applications in the business environment, the retrofit installation of delicate and sophisticated cabling such as twisted pair and fiber optic cables has become more and more of an issue. Unlike conventional electrical wiring, such cabling cannot be abused either in its installation or use. Bending excessively, kinking, sharp bending, contact with sharp edges, etc. all can cause harm to the cable which affects its intended performance. This problem is not quite so significant in new construction where cable trays designed to receive such cabling are installed during construction to accommodate current and future needs. In retrofit applications, however, means must be provided for the easy, safe and secure installation and maintenance of such cabling.

Accordingly, a number of hangers or supports for such cabling have been designed and marketed primarily for the retrofit market. For example, U.S. Pat. No. 5,740,994 describes a cable support which is generally J-shaped and has a saddle portion which is curved around the base of the J and flat across the base of the J. Downward extending flanges on either side of the flat base of the J are provided to ease the transition of a sagging cable suspended between two such supports as the cable is laid from one side of the support, across the flat portion of the support and off of the other side thereof. Use of the cable support described in this patent requires the use of a separate cable tie across the open face of the J to secure the cable after installation.

A variety of flexible such supports have also been suggested for such use. One such device is manufactured and sold by Caddy Fasteners of Solon, Ohio. This device utilizes a flexible strap having one end thereof attached to a mounting base and the opposing or free end thereof including a rigid cross member whose exposed ends engage tabs on the mounting base when the flexible strap is folded upon itself to encompass inserted wiring. In order to tightly secure the strap to the mounting base, crimping of the mounting base incorporated tabs is necessary. While such crimping provides a secure closure of the support, removal of a wire or the insertion of another wire or wires is made more complicated by the need to "uncrimp" the tabs to permit removal of the flexible strap.

U.S. Pat. No. 5,964,434 to E. J. Lynch, Jr. issued Oct. 12, 1999 describes a fireproof cable loop forming strap of substantial width having pockets at each end to receive front and rear spreader bars that project beyond the lateral edges of the strap and are designed to engage hook tabs projecting from the face of a hanger plate or yoke for mounting. According to a preferred embodiment, the rear spreader bar is preassembled with the yoke or hanger plate so that it cannot be removed therefrom. While such a device provides a useful cable support, the use of spreader bars results in the increase in the number of parts that may be lost or become separated from the hanger prior to installation and increases the number of steps required to complete installation, since at least the front spreader bar must be inserted into its pocket prior to mounting. Additionally, the presence of spreader bars that extend beyond the lateral edges of the strap requires that a wider area be found for installation of the hanger. Since use of such devices is often in areas of very limited space, the need to find a relatively wide area into which to install the strap complete with spreader bars may be very inconvenient.

U.S. patent application Ser. No. 09/295,082 filed Apr. 20, 1999, which is incorporated by reference herein in its entirety, describes an integral communications or other similar cable hanging strap that comprises a base for mounting on an appropriate structural member, a flexible strap integrally formed with the base, the flexible strap having a base end attached to the base and a distal end that includes an aperture for engaging an appropriate attachment button on the front side of the base. While this device provides a suitable mounting device for communications cable and the like, it possesses one shortcoming. The shortcoming is that the distal end engaging the button can become accidentally separated from the button during subsequent movement of the support during the installation of additional cables or other construction and installation activities.

OBJECTS OF THE INVENTION

It is an object of the present invention to provide a flexible cable support structure that provides an integral cable support with rapid and easy securing of the flexible strap to its mounting without the need for crimping or other additional installation steps.

It is a further object of the present invention to provide a flexible cable support that provides a secure mounting for cables or wiring that can be readily disassembled for removal of one or more wires or the insertion of additional wires without the need to "uncrimp" or otherwise perform additional operations to unfasten the support.

It is yet another object of the present invention to provide a flexible cable support that while easy to assemble, install and intentionally disengage, will not allow accidental disengagement.

SUMMARY OF THE INVENTION

According to the present invention, there is provided a unitary or integral communications or other similar cable hanging strap that comprises a base for mounting on an appropriate structural member, a flexible strap integrally formed with the base, the flexible strap having a base end attached to the base and a distal end that includes an aperture for engaging an appropriate attachment button on the front side of the base as well as tabs on the rear surface of the strap that inhibit accidental disengagement of the flexible strap, but permit easy intentional disengagement thereof. In use, wiring to be supported is placed within the flexible strap, the strap bent to encompass the wiring and the aperture engaged about the attachment button with concurrent engagement of tabs on the rear surface of the strap with the base. This construction provides a wiring support that is not easily disengaged by random movement of the wiring, but is easily opened by disengagement of the tabs with the base by bending of the flexible strap for removal of one or more wires or insertion of additional wires. The improvements described herein relate to structural reinforcements and materials selections that resist the "creep" of the materials of construction when such devices are exposed to high temperatures, above about 125° F., under heavy loading conditions.

DESCRIPTION OF THE DRAWINGS

The following Figures wherein like numerals represent like elements will better serve to illustrate the cable support of the present invention.

FIG. 8 is a front view of an alternate preferred embodiment of the cable support of the present invention.

FIG. 9 is a cross-sectional view of the cable support of FIG. 8.

DETAILED DESCRIPTION

While the cable support described in the above-referenced parent application provides a fully satisfactory cable supporting device in most installations, it has been noted that when installed in an environment where the device is exposed to loading conditions approaching its maximum design load and ambient temperatures in the installed location reach temperatures in excess of about 125° F., the cable support at both its attachment point as well as its securing point, as described hereinafter, are subject to "creep", i.e. the material of the device tends to deform, thereby reducing the utility thereof by rendering it more difficult to disassemble. Thus, there is a need to modify the device to inhibit such "creep" and retain the original configuration of the device even under such extreme use conditions.

Figure 1:
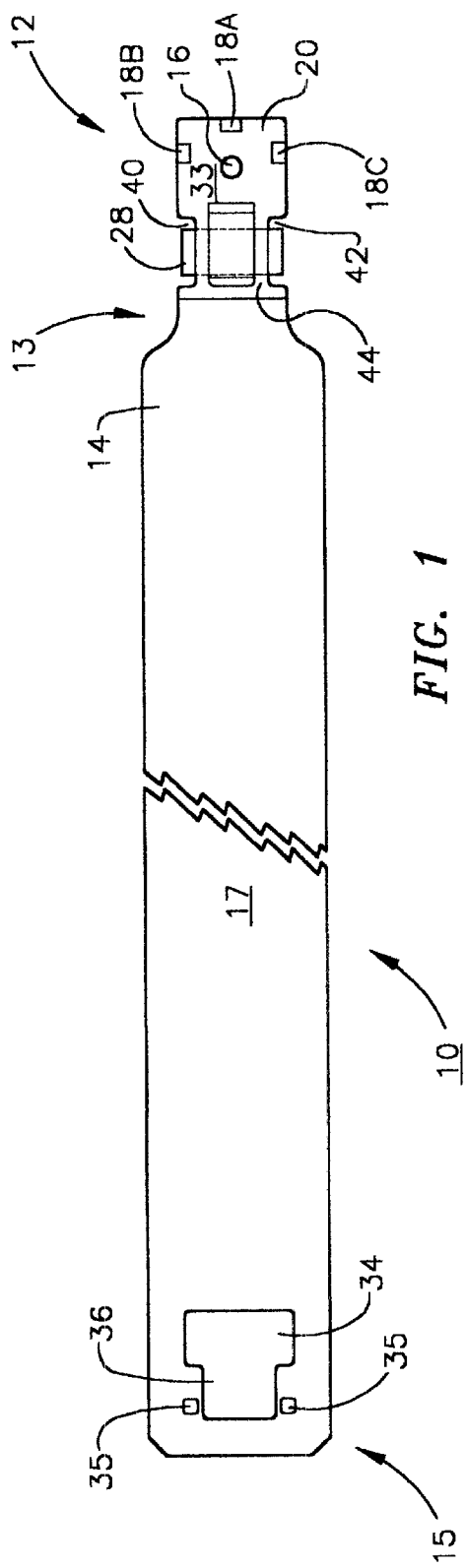
FIG. 1 is a rear plan view of the cable support of the present invention.

As shown in FIG. 1 cable support 10 of the present invention comprises a base 12, having integrally formed therewith, strap 14 that preferably extends from front surface 31 of base 12. Base 12 further includes apertures 16 and 18*a*–18*c* for attaching base 12 and consequently cable support 10 to a surface, stud or other structural or additional mounting member such as a rod as described hereinafter. As used herein, the terms "structure" or "structural member" are meant to refer to a portion of the actual structure, i.e. a wall, ceiling etc, or alternatively some member attached to the actual structure suitable for supporting installed cables such as a pipe, spacer or other suitable structural attachments. While strap 14 is depicted as extending from front surface 31, according to an alternative embodiment, it could also extend from rear surface 33.

Figure 2:
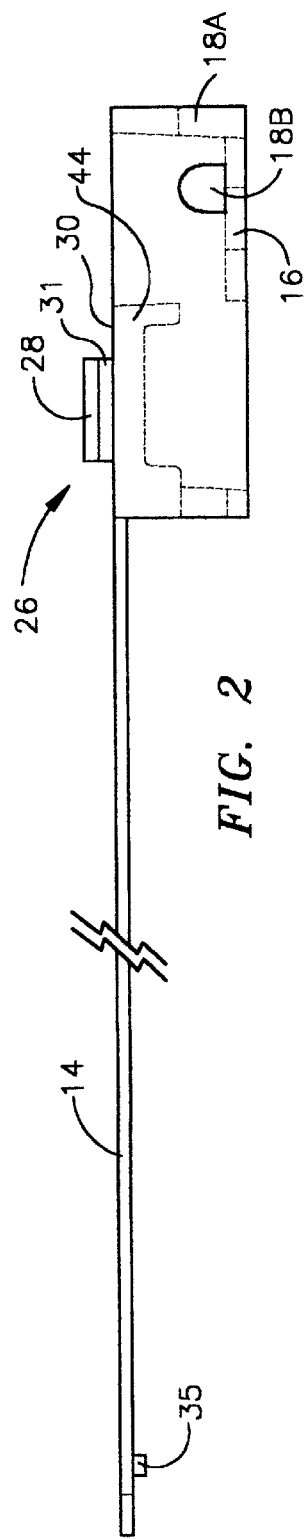
FIG. 2 is a partially phantom side view of the cable support shown in FIG. 1.
Figures 3, 4:
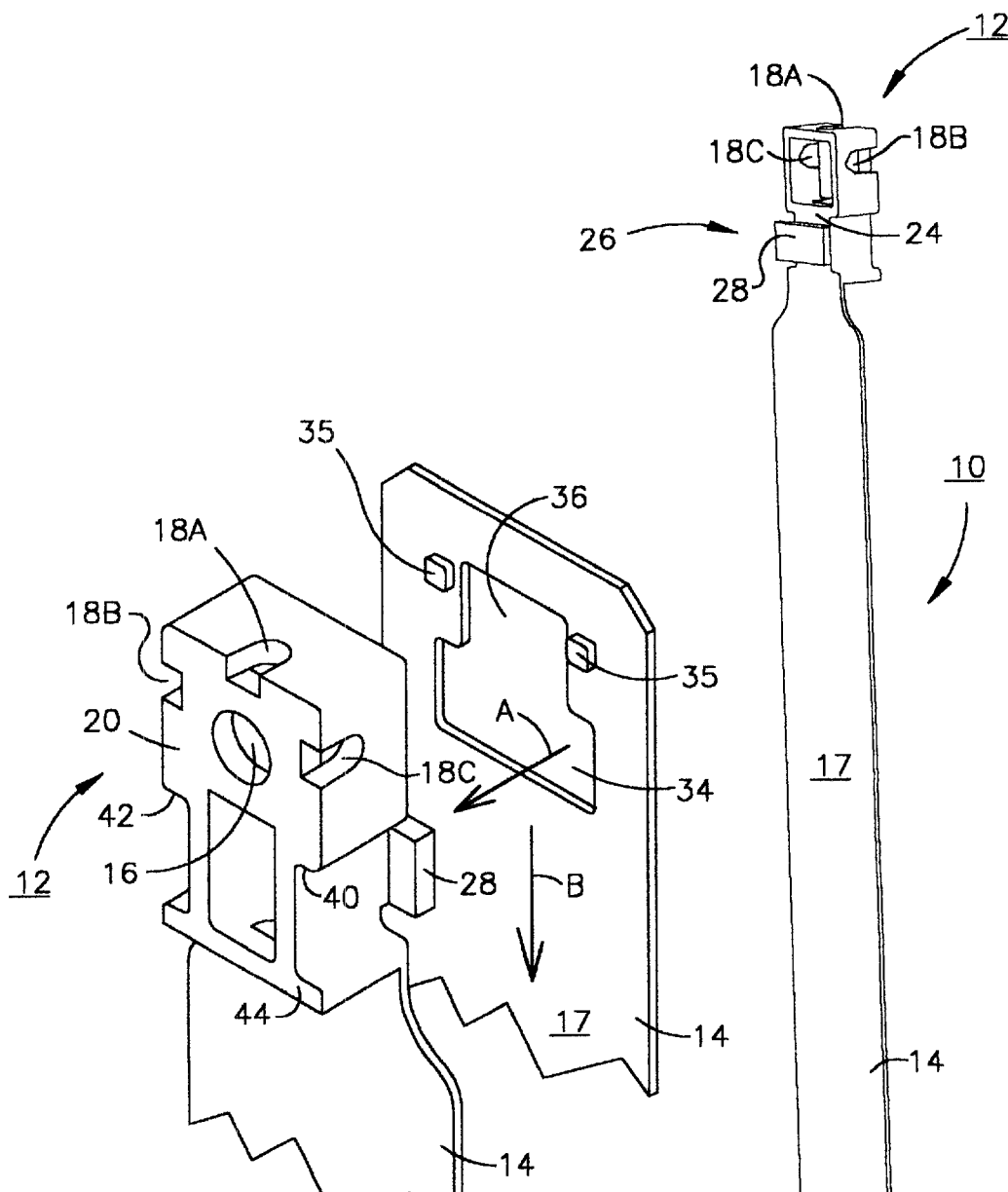
FIG. 3 is a detailed rear perspective view of base and engagement mechanism of the cable support of the present invention.
FIG. 4 is a front plan view of the cable support depicted in FIG. 1.

Referring now to FIG. 3, base 12 includes a mounting block 20 having apertures 16 and 18*a*–18*c* therein for mounting of cable support 10 to a ceiling or other overhead horizontal structure or a wall or other vertical structural member. In all of the embodiments shown in FIGS. 1 through 5, base 12 is narrower than strap 14 (but may actually be wider or of the same width as strap 14) and includes a variety of apertures 16 and 18*a*–18*c* for attachment to a wall, ceiling or other structural element in any of the X, Y or Z directions. These attachment apertures are all provided in a hollow rectangular box-like structure forming mounting block 20 of base 12. Aperture 18*a* in the top of box-like mounting block 20 is accessed through a matching aperture 23 in flange 25 that forms the bottom of base 12 and the hollow interior 27 of base 12 that permits attachment to a ceiling or other horizontal structure using a suitable fastener (not shown). Apertures 18*b* and 18*c* in the side walls of box-like structure mounting block 20 are accessed through each other and allow attachment to, for example, a wall or other vertical structure by insertion of a suitable fastener (not shown). Aperture 16 in the rear wall of hollow box-like mounting block 20 permits attachment to a vertical structure such as a wall.

While mounting block portion 20 is shown as being hollow in the attached Figures for purposes of recessing the various fasteners inserted into the apertures 16 and 18*a*–18*c*, to reduce the amount of material needed to fabricate mounting block 20 and to permit access for fastener attachment, a useful such member that is solid with appropriate recesses and passages could also be substituted. It should be noted that mounting block 20 may be substituted with any number of alternative structures as have been used to attach cable support elements to a variety of structural members and that mounting block 20 as depicted is merely representative of one embodiment of these various attachment means.

Figure 5:
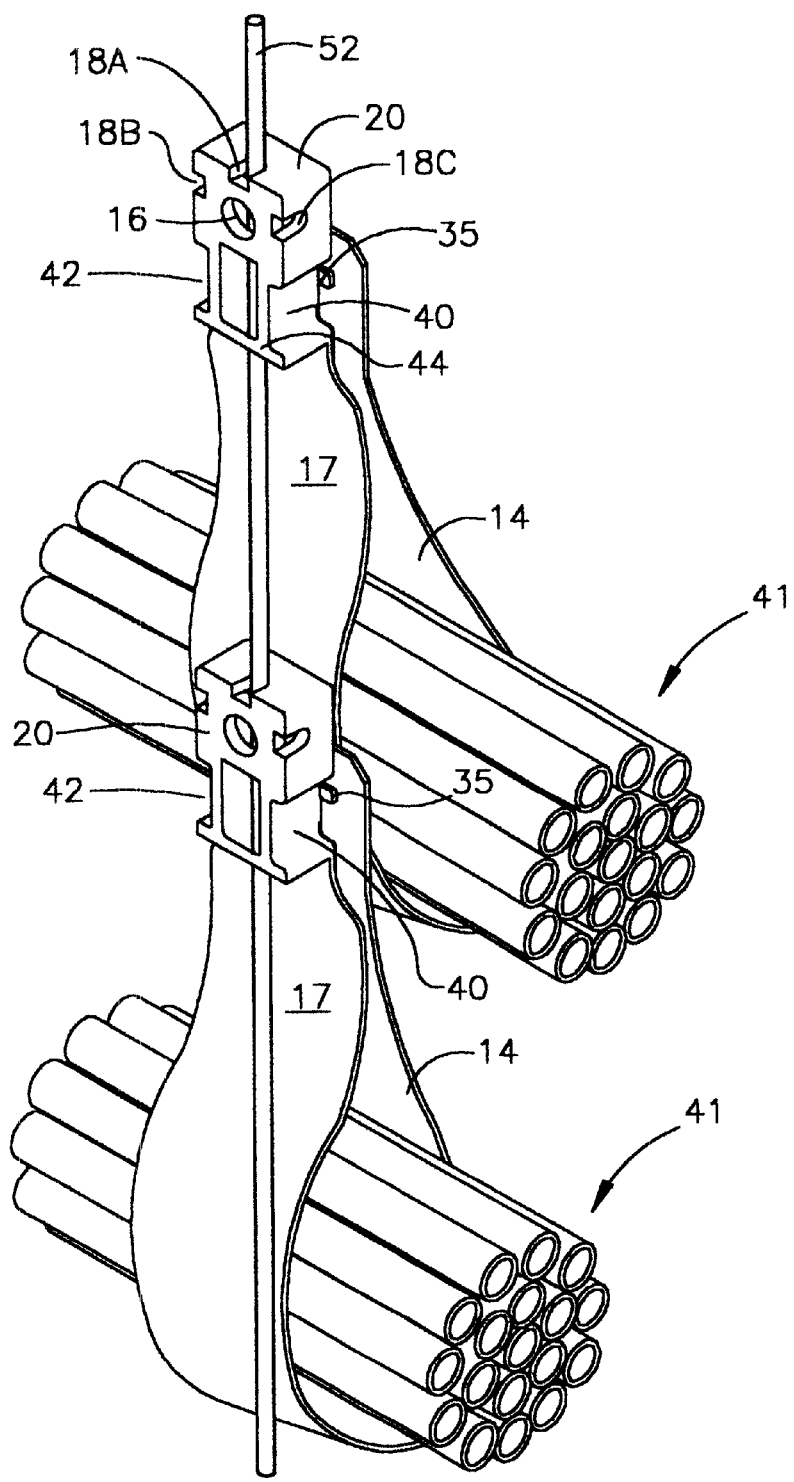
FIG. 5 is a perspective view of a series of the cable supports of the present invention, including encompassed cables, suspended from a suitable mounting rod.
Figure 6:
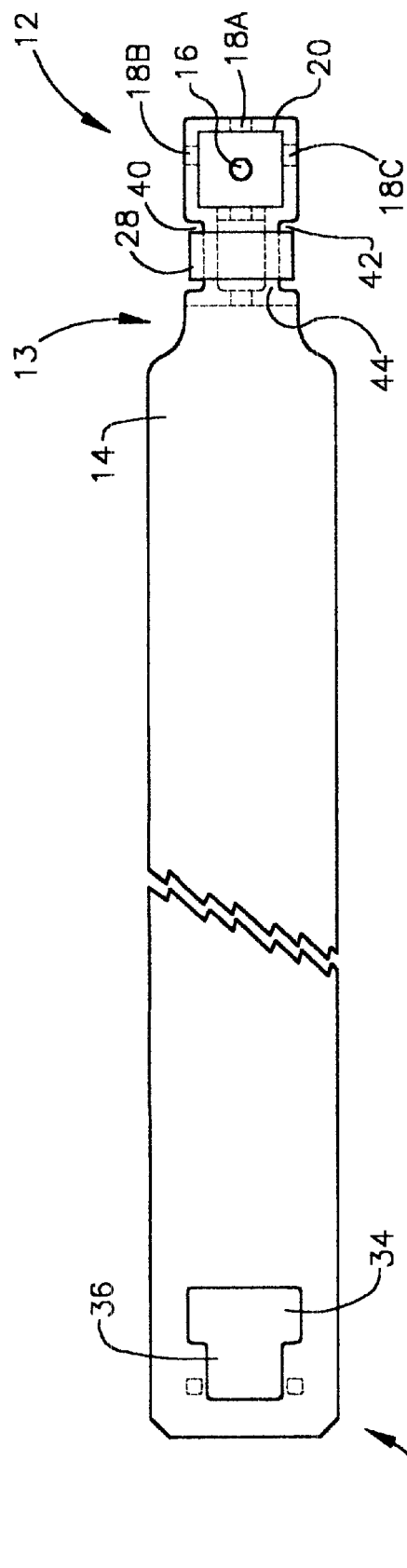
FIG. 6 is a top view of an alternative preferred embodiment of the cable support of the present invention incorporating the improvements described herein.

Access to aperture 18*a* via aperture 23 in flange 25 also permits the insertion of a rod 52 as shown in FIG. 5 for "ganging" or serial attachment of a series of cable supports 10, when rod 52 is attached to a structural member and a number of cable supports 10 are in turn suspended therefrom.

On the front surface 31 of base 12 is a button 26 having a head 28 and a post 30 (best seen in FIG. 2). Post 30 is an integral extension of front surface 31 of base 12. Head 28 is wider than post 30 in the horizontal direction as defined when cable support 10 is hung in its normal use position as depicted in FIG. 5. While head 28 is depicted in the accompanying Figures as being rectangular, the skilled artisan will immediately realize that head 28 could also be round, oval, octagonal etc., as long as key hole shaped aperture 32, defined below, is of similar engaging shape. The roles of these two portions will be explained more fully below.

As best seen in FIGS. 1 and 4, strap 14 that is joined or integrally formed with base 12 at its base end 13 includes near its distal end 15 keyhole shaped aperture 32 having a wide portion 34 and a narrow portion 36. It is to be noted that the term "key hole shaped" as used herein is meant to define any aperture having at least two portions one of which is larger than the other such that the strap or element containing the "key hole shaped" aperture can engage a suitably similarly shaped button by insertion of the wider portion over the head of the button and engagement of the narrower portion with a post as will be described below. Thus, as with button 26, keyhole shaped aperture 32 may include circular, rectangular, oval portions or any combination of such shapes so long as engagement of the encompassing strap element with button 26 and its support is obtained.

Referring now to FIGS. 2, 3 and 4, on front surface 17 of strap in the area of narrow portion 36 and preferably on either side thereof are tabs 35 that protrude from front surface 17. The particular location, size and shape of tabs 35 may, of course be varied broadly, it being only important that they serve to engage some portion of base 12, preferably as described below, to inhibit accidental disengagement of aperture 32 with button 26. Tabs 35 must also be located in a position that permits there relatively easy disengagement from base 12 by "backflexing", i.e. bending backward, of strap 14 from base 12 to permit disengagement of tabs 35 from base 12 as described below.

When strap 14 is flexed to provide a support or cradle for enclosed cable 41 as shown in FIG. 5, wide portion 34 of key hole shaped aperture 32 passes over head 28 (in the direction shown by arrow A in FIG. 3) and as weight is applied downward on strap 14 (as shown by arrow B in FIG. 3), narrow portion 36 engages post 30 and tabs 35 engage some portion of base 12. In the case depicted in the accompanying drawings, engagement of tabs 35 is with recesses 40 and 42 in lower portion 44 of base 12. In this position, strap 14 can only be disengaged from head 28 by flexing strap 14 backward, away from base front surface 31 so that tabs 35 are disengaged from contact with base 12 at recesses 40 and 42 with concurrent upward movement of strap 14 (in the direction opposite that shown by arrow B in FIG. 3) so that wide portion 34 is aligned with head 28, and lifting strap 14 so that wide portion 34 fits over head 28 (in the direction opposite that shown by arrow A in FIG. 3). With proper sizing of head 28, support 30 and wide and narrow portions 34 and 36, disengagement of strap 14 can only occur by careful manipulation of strap 14 and disengagement of tabs 35 and will not be initiated by random movement of strap 14 relative to support 30 and head 28. While tabs 35 are shown in the accompanying drawings as engaging elongated recesses 40 and 42, suitable recesses could also comprise simple "holes" or slots in base front surface 31 that serve to engage tabs 35. Similarly, a single tab 35 that engages a single recess in base front surface 31 would be suitable. It being only necessary that tab(s) 35 engage some suitable portion of base 12 to inhibit accidental disengagement of strap 14 from base 12.

According to a preferred embodiment, strap 14 is made of nylon and most preferably of nylon of a thickness of from about 0.025" to about 0.060". Nylon materials of this thickness while being flexible provide sufficient rigidity to assure retention of engagement aperture 32 with post 30 and head 28 and tabs 35 with base 12 even when only a minimum of weight is applied to strap 14 by cable enclosed therein. As will be obvious to the skilled artisan, other flexible polymeric or metallic materials of suitable properties may be substituted for the preferred nylon. According to a highly preferred embodiment, a polypropylene copolymer demonstrating the following physical properties is used to fabricate the cable support: 1) a flexural modulus on the order of 170,000 psi; 2) a maximum continuous use temperature on the order of above about 200° F. (most preferably above about 225° F.); and 3) a tensile strength above about 3500 psi.

Similarly, strap 14 may be of any suitable width and length dimensions. Cable support 10 depicted in FIG. 5, for example, is about 20 inches long and about 5 inches wide as is necessary to carry the substantial volume of cable 41 shown. Alternative embodiments, however, may comprise a strap as narrow as one half to three quarters of an inch and be less than six inches long. Similarly, strap 14 may be of a single width along its entire length (see for example FIG. 9) except perhaps where it joins base 12 at base end 13, as depicted in the accompanying drawings, or may be of a varying width along its length to accommodate a particular cable or installation situation. The selection of the physical dimensions of the various members of cable support 10 is well within the capabilities of the skilled artisan. Strap 14 may also incorporate holes (not shown) to reduce the amount of material required in fabrication. As long as such holes do not unduly weaken strap 14 their presence in strap 14 is entirely acceptable.

As will be apparent to the skilled artisan, any number of alternative configurations can be envisioned for base 12 to provide alternative methods for attachment to a structural member. For example, base 12 could incorporate a hook for engagement with a beam or joist etc.

As best shown in FIG. 2, strap 14 may be of variable thickness. In the embodiment depicted in FIG. 2 strap 14 is of three distinct thicknesses. In area of strap base 13 closest to base 12 where maximum pressure is applied during flexing a thickness of from about 0.050 to about 0.090 inches is preferred. In body 13a of strap 14 a thickness of from about 0.025 to about 0.050 inches is considered adequate, while in area 13c at distal end 15 of strap 14 that contains aperture 32 and, where maximum pressure will be applied during the support of inserted cables, a thickness of from about 0.050 to about 0.090 inches is again preferred.

Figure 7:
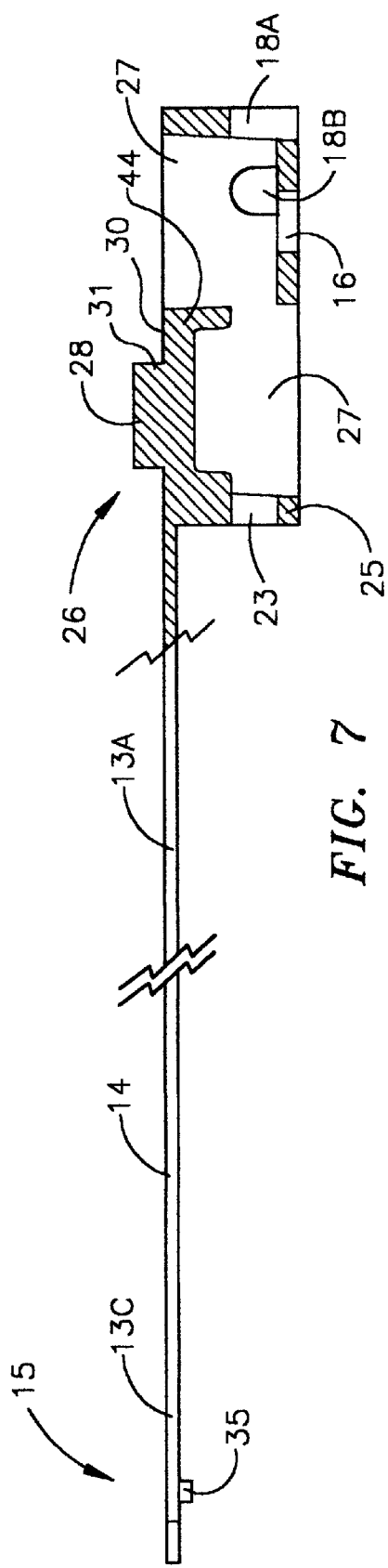
FIG. 7 is a cross-sectional view of the cable support of FIG. 6.
Figure 10:
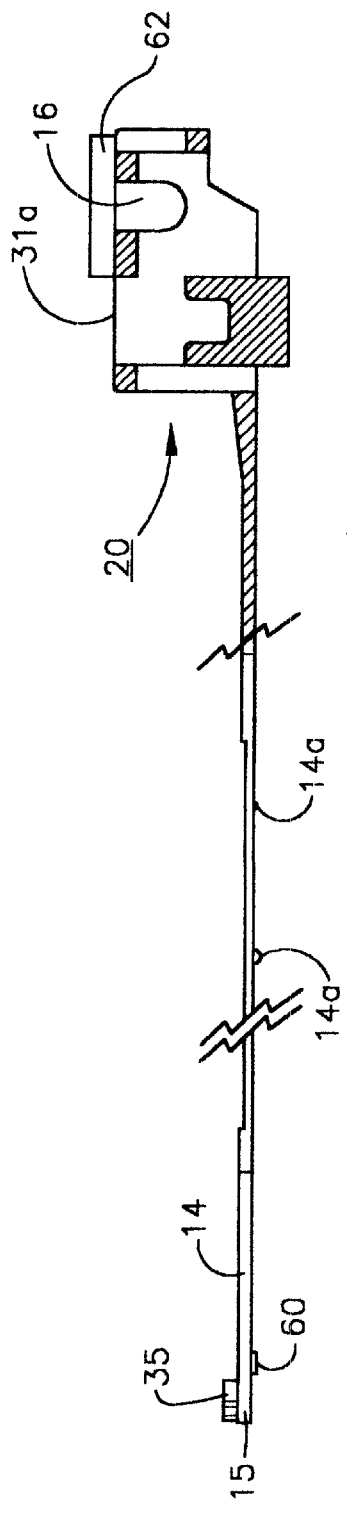
FIG. 10 is a right side view of yet another preferred embodiment of the cable support of the present invention.
Figure 11:
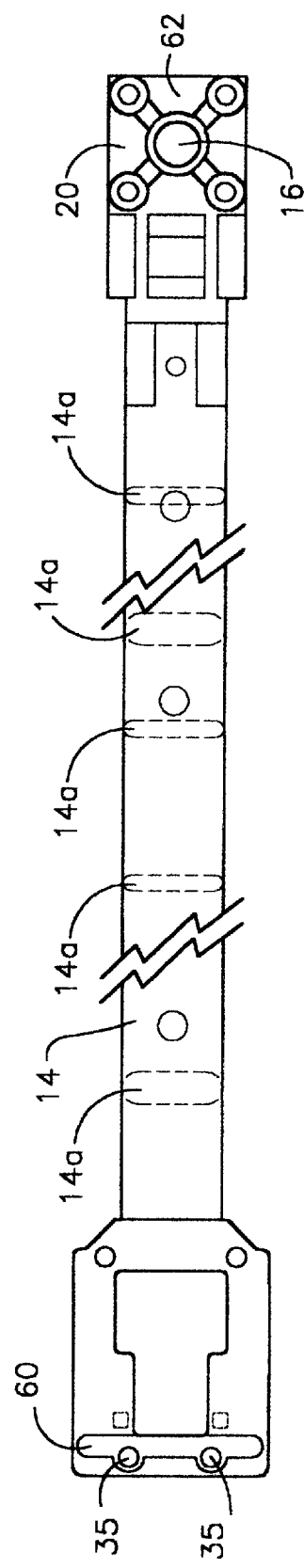
FIG. 11 is a bottom view of the cable support of FIG. 8.

Referring now to FIGS. 6–9 that depict various views of improved cable supports incorporating the "creep" resistance features of the present invention wherein all previously described features are similar, cable support 10 further incorporates a series of transverse ridges 14a along the top surface 15a of strap 14. These ridges serve to reinforce strap 14 in the transverse direction and also serve to support handling of cable support 10 in the manufacturing process. Transverse ridges 14a may be of any suitable height, but are preferably less than about 0.1 inch in height and integrally formed with strap 14. Ridges 14a may be rounded or square as shown in FIG. 7 and located on either planar surface of strap 14.

As also shown in FIGS. 6–9 the enhanced cable support of the present invention incorporates a transverse reinforcing flange 60 at a point between narrow portion 36 and distal end 15 of strap 14. Transverse reinforcing flange 60 extends from and is integrally formed with front surface 15a of strap 14. According to a highly preferred embodiment of the present invention, ridge 60 extends approximately the entire width of strap 14 and has a height of between about 0.1 and about 0.2 inches. Preferably transverse reinforcing ridge 60 is about 0.15 to about 0.18 inches high.

Finally, as best shown in FIGS. 7 and 8, in order to inhibit "creep" in the area of a fastener inserted through aperture 16 to secure cable support 10 to a wall or other vertical structural member, a peripheral flange 62 is provided to increase the thickness of mounting block 20 on the rear surface 31 a thereof in the area of aperture 16. Such enhancement, increase the resistance of mounting block 20 in the area of aperture 16 to "creep" at elevated temperatures and high applied loads.

As the invention has been described, it will be apparent to those skilled in the art that the same may be varied in many additional ways without departing from the spirit and scope of the invention. Any and all such modifications are intended to be included within the scope of the appended claims.

What is claimed is:

1. In an integral cable support comprising:
   A) a base having a front and a rear surface and at least one recess therein;

B) a flexible strap having a front surface and a rear surface, a base end attached to either said base front or rear surface and a distal end;

C) a button on said front base surface comprising a post on said base front surface and a head atop said post, said head being of a greater dimension than said post;

D) a key hole shaped aperture proximate said distal end including a wide portion of a size to pass over said head and a narrow portion of a size to engage said post; and E) at least one tab on said flexible strap front surface wherein said wide portion passes over said head when said strap is bent upon itself to form a cable cradle, said narrow portion engages said post when weight is applied to said strap bent upon itself after said wide portion has been passed over said head and said at least one tab engages said at least one recess in said base after said narrow portion engages said post, the improvement comprising fabrication of said cable support from a low smoke emission polymeric material having a maximum continuous use temperature on the order of above 200° F. and a tensile strength above about 3000 psi.

2. The cable support of claim 1 wherein said base includes laterally opposed recesses, said tabs are two in number located on either side of said narrow portion and said two tabs each engage one of said laterally opposed recesses.

3. The integral cable support of claim 1 wherein said strap extends from said base front surface.

4. The integral cable support of claim 1 further including a mechanism for attaching said base to a structural member.

5. The integral cable support of claim 4 wherein said mechanism comprises at least one aperture in said base.

6. The integral cable support of claim 5 wherein said mechanism includes a plurality of apertures for attachment of said base in any of the X, Y or Z directions.

7. The integral cable support of claim 1 wherein said strap has a thickness of between about 0.025 and about 0.060 inches.

8. The integral cable support of claim 1 wherein said strap is an extension of said rear surface.

9. The integral cable support of claim 1 wherein said base end and said distal end are of a different thickness than said central portion.

10. The integral cable support of claim 1 wherein said post, said head and said distal end aperture are all generally rectangular.

* * * * *